Patented Oct. 3, 1944

2,359,415

UNITED STATES PATENT OFFICE 2,359,415

PROCESS FOR REFINING TALL OIL

Frederick H. Gayer and Charles E. Fawkes, Chicago, Ill., assignors to Continental Research Corporation, Chicago Heights, Ill., a corporation of Illinois No Drawing. Application March 19, 1942, Serial No. 435,428

19 Claims. (Cl. 260—97.5)

This invention relates to the refining of tall oil and particularly to a sulfuric acid refining process embodying an improved treating step for the removal of sulfated compounds resulting from reaction of the sulfuric acid with the tall oil components, to yield a refined and clarified tall oil of improved odor, color and clarity.

The aim of a practical process for refining tall oil is the elimination of the unpleasant odor, the color and the unsaponifiable matter without unfavorably affecting the fatty and resin acids.

In our patents, Nos. 2,223,850 and 2,248,346 we teach a process for the refining and obtaining of valuable products from tall oil or a solution of tall oil in certain organic solvents such as hydrocarbons, by means of sulfuric acid under certain special conditions. The present invention is directed to an improvement in such processes, or more specifically, an improved step in such processes which is particularly useful when the refining of the tall oil is carried out in the presence of a solvent, or when the specific clarifying step, hereinafter more fully discussed, is carried out when the oil is dissolved in such solvent. Although in general our sulfuric acid refining process does not necessarily require the presence of a solvent, the addition of the solvent greatly facilitates the clean separation of the resulting precipitate. However, we may first treat the oil in the absence of a solvent, and after separating the precipitated matter dissolve the oil in a solvent for final treatment in accordance with the process of the present invention, the presence of solvent at such stage aiding in the clean separation of phases in the de-acidifying procedure.

The refining of crude tall oil as set forth in our aforementioned patents comprises treating the tall oil while agitating and at a temperature of from about 0° to about 35° C. with from about 2 to about 12% by weight of sulfuric acid. The acid may be added in either one large or several smaller portions or increments. The precipitates so formed are removed either by settling or centrifuging or filtration. The concentration of the acid used in the treatment may range from about 60° Bé. to approximately 66° Bé. In the event the water content of the tall oil is of appreciable magnitude, acid of greater strength may be used, and likewise acid of lesser concentration than 60° Bé. may be used in larger quantity. The use of acids of different strength and in separate increments makes for flexibility in the process of the removal of petroleum insoluble and the unsaponifiable matter including phytosterol. As solvent for the tall oil we may use any solvent which is not acted upon by sulphuric acid and which is non-solvent for the substances precipitated by sulphuric acid. While aromatic hydrocarbons serve the purpose, especially when lower concentrations of sulphuric acid are used than 66° Bé. we prefer petroleum solvents, such as for example gasoline or naphtha. Such a petroleum solvent should preferably have a narrow boiling range and its end point on distillation should be such as to make easy removal and recovery of the solvent possible.

After the acid treatment and separation of either the precipitate obtained in one acid treatment or of the sludge formed as a result of a second acid treatment, we obtain a clear oil or oil solution the color of which is still dark. At this stage the acid treated oil invariably contains a varying amount of mineral acidity originating from the sulphuric acid. This acidity, as distinguished from that due to the organic acids, namely fatty and resin acids, can be exactly determined by direct titration of a measured volume of the oil solution with standard alkali. Using rather large quantities of suitable indicators, as for instance methyl orange, or thymol blue, and insuring sufficient contact between the oil solution and the aqueous alkali by rotating the flask containing the sample, a sharp end point is obtained in the moment the mineral acidity is neutralized. We express this acidity by the number of cubic centimeters of normal alkali solution required to neutralize the mineral acidity in 100 cc. of acid treated tall oil or tall oil solution.

Subjecting acid treated tall oil or tall oil solutions to a centrifugal force several hundred times that of gravity does not materially alter the amount of mineral acidity. This indicates that the acidity of the oil is not due to suspended sulphuric acid which, being insoluble and of a high specific gravity, would settle out under severe centrifuging. We consider, therefore, that the sulphuric acid forms, with certain components of tall oil, compounds of a strong acid nature which are soluble in the oil. We have, in fact, succeeded in isolating these compounds from acid treated tall oil solutions as will be shown hereinafter.

The three component groups of tall oil, namely fatty acids, resin acids, and unsaponifiable, all possess considerable unsaturation and are therefore reactive toward sulphuric acid. By combining the unsaturated molecules sulphuric acid may form compounds with either one or more of these groups. Sulphuric acid can combine with unsaturated compounds in several different ways and the resulting products are collectively termed sulphated compounds. They react as mineral acids since only one acid equivalent enters into reaction with the double bond. The sulphated compounds in acid treated tall oil are extremely unstable. On standing they decompose, splitting into their organic component and sulphuric acid. The latter then settles out spontaneously thereby decreasing the mineral acidity of the solution itself.

The following Table I shows the change of mineral acidity with time. These figures were obtained by treating tall oil solutions from which the petroleum insoluble matter and phytosterol had been first removed in a separate treatment, and then treated with 4% by weight increments of 60° and 66° Bé. sulphuric acid respectively, centrifuging and determining the mineral acidity at intervals over a period of several days:

Table I

| Time | Cc. normal NaOH required to neutralize mineral acidity in 100 cc. solution | |
| --- | --- | --- |
|  | 60° | 66° |
| After centrifuging | | 28.0 |
| Standing 45 minutes | | 19.0 |
| Standing 1 hour | 5.8 | 17.6 |
| Standing 1½ hours | 5.5 | |
| Standing 3¼ hours | | 13.0 |
| Standing 6½ hours | | 10.0 |
| Standing 17 hours | 3.3 | 8.3 |
| Standing 24 hours | | 6.7 |
| Standing 72 hours | 2.2 | 4.0 |

The initial mineral acidity increases with the strength and quantity of the sulphuric acid used for treatment. It depends also on the temperature at which the acid treatment was made, on the oil-solvent ratio and on the duration and degree of stirring. The rate of decrease becomes considerably higher with rise of temperature but even more so by the presence of small quantities of water over that present in the acid.

Adding a small quantity of water, stirring for a few minutes immediately after the acid treatment, but before separation of the sludge, causes a rapid decrease of the mineral acidity. For example, one-eighth percent water as calculated on the volume of a tall oil solution treated with 4% 66° Bé. sulphuric acid will cause a mineral acidity 3.6 points lower on one hour's standing, and 2.9 points lower on 24 hours' standing, than that indicated in Table I. One quarter percent water will in the same time cause decreases of 7.1, and 3.9 points respectively. With two percent water there is still a decrease as compared with one percent water after 1 hour's standing. Subsequently, however, the rate of decrease slows down until after 24 hours' standing the mineral acidity is higher than in the example using one percent water. This apparent anomaly finds an explanation in the peculiar solubility properties of hydrated sulphated compounds.

The presence of the sulphated compounds in an acid treated tall oil solution is highly undesirable. Not only do these compounds impart a dark color to the oil solution but due to their corrosive nature they make distillation of the solvent and obtaining a light colored product impossible. We have found that on removing the sulphated compounds, the tall oil solution undergoes a striking improvement in color, and the solvent can be distilled without complication, yielding a light colored, odorless and stable oil.

As a further result of the oils being refined and clarified by our process there results on standing, often for only a few hours, a much greater than normal deposition of a large quantity of resin acid crystals. By filtration or centrifuging we can separate these crystals and obtain crystalline abietic acid and a refined tall oil of higher fatty acid content.

That step in our process which is concerned with the removal of the sulphated compounds and results in a light colored, clear, non-emulsifying oil or oil solution we term in plant practice the "clarifying" step.

Clarifying an acid treated tall oil solution by storing it for a long time is not practicable, since, aside from the large storage demands and solvent losses, even after months of settling there is still a trace of acidity left. Neither is washing the acid treated tall oil solution at ordinary temperatures with water a simple operation because the sulphated compounds, while soluble in water, are remarkable emulsifying agents.

In our aforementioned patents we effect the removal and decomposition of the sulphated compounds with water. The sulphated compounds are soluble in water which already at ordinary temperature hydrolyzes the least stable portion of these compounds. However, unless extreme care is used, the presence of the more stable sulphated products causes emulsification of the unreacted major portion of the tall oil or tall oil solution. This makes a quantitative separation of the aqueous and the oil phase impossible. To break the emulsion the temperature of the mixture has to be raised. Carried to its extreme, said method of our prior patents contemplates refluxing or boiling the mixture for a sufficient time to effect hydrolysis of all the sulphated compounds present. The advantage thereof is the full regeneration of the organic portion of the sulphated molecules, thereby increasing the yield of refined oil. While fully practicable for acid treated tall oil solutions, we favor the method of treatment with water at high temperature especially for acid treated tall oil without solvent. The absence of a solvent permits heating the oil with water in open, acid-proof, as for example, wooden tanks, yielding the refined oil as upper layer.

The method of the present invention relates to clarifying acid treated tall oil preferably in solvent solution by removing the major portion of the sulphated compounds as such as a separate, heavier layer from the oil solution.

We have discovered that certain definite proportions of weak aqueous salt solutions, when mixed with an acid treated tall oil solution, cause the concentration of the major portion of the sulphated compounds in a heavier lower layer which is easily separated from the oil solution. The small residual mineral acidity is then easily removed by washing with water or neutralization or a combination of the two.

Such salts include neutral or alkaline salts of the alkali and alkaline earth metals and also such commercially available salts as those of aluminum. The concentration of these salts may range from approximately one hundredth normal to approximately one half normal or, expressed in approximate percentage strength, from less than one tenth per cent up to approximately five per cent by weight on the weight of the aqueous solution. Thus we may use alkali metal chlorides, sulphates, phosphates, borates, aluminates, etc., ranging in concentration from 0.1 per cent to approximately 5 per cent but not exceeding one half normal. Alkaline earth compounds such as for example, calcium chloride, and also aluminum salts are preferably used in a concentration of about 0.2 to 0.6 per cent. Saturated solutions of calcium sulphate, and calcium hydroxide, representing concentrations at ordinary temperature of approximately 0.2 and 0.15 per cent respectively, also are highly efficient clarifying agents. We also may use dilute solutions of the alkaline salts or hydroxides of the alkali metals but only in such amounts that only a small fraction of the mineral acidity present is neutralized. Since on neutralization a salt of the sulphated compound or of the sulphuric acid split off by hydrolysis is formed, the use of dilute alkalies in limited amount for clarifying is fully equivalent to the use of dilute salt solutions.

This method of clarifying acid treated tall oil solutions requires careful plant control and strict standardization of all the elements entering into the acid treatment of tall oil, such as the oil-solvent ratio, the concentration and quantity of sulphuric acid, temperature, time and degree of stirring, and time of settling. Given otherwise the same conditions, the time of settling, that is the time elapsing between the acid treatment and the clarifying treatment, is the decisive factor in the application of this method. As shown in Table I, this period of time determines the concentration of the sulphated compounds which is highest immediately after the acid treatment and from there on decreases, very rapidly in the first few hours, then gradually slower. The proportion of clarifying agent required to cause a clear separation of layers is in a definite and direct relationship to the concentration of the sulphated compounds as expressed in terms of the mineral acid content of the oil at the time of clarifying. The higher the mineral acid content as shown by titration of the oil solution, the higher is the proportion of clarifying agent to be added, in order to obtain a fast and sharp separation of layers, as is illustrated by the two following examples:

EXAMPLE I

A solution of a tall oil from which the petroleum insoluble and phytosterol had been removed by a previous acid treatment, was treated with 4% by weight of 66° Bé. sulphuric acid. After settling 3 hours it had a mineral acidity of 13.0 cc. N per 100 cc. and required approximately 6.5% to 12.5% by volume of saturated calcium sulphate clarifying solution calculated on the volume of the oil solution to cause the separation of the sulphated layer.

EXAMPLE II

The same oil solution, allowed to settle for 24 hours, showed a mineral acidity of 6.7 cc. N per 100 cc. solution and gave a separation with 3% to 8% clarifying solution. A further decrease of the mineral acidity to 4.0 cc. N brought the requirements for clarifying solution down to 2% to 6%.

The upper and lower limits indicated in these foregoing examples are critical limits. Using less clarifying solution than the lower limit indicated will give no separation of layers, in fact will often result in a clear transparent solution of the clarifying solution in the tall oil solution. On the other hand, exceeding the upper limit invariably causes emulsification. A rapid and sharp separation is obtained only if the volume of the clarifying solution is between the limits corresponding to the mineral acidity at the time of clarifying.

Since the nature and proportion of the individual tall oil components and therefore the composition of the resulting sulphated products will be different in tall oils of different origin, solutions of such tall oils, even though they were subjected to the same previous treatment and show the same mineral acidity, might exhibit somewhat different lower and upper limits as to the volume of the clarifying solution to be used.

With the same tall oil as starting material the requirements for clarifying solution at different mineral acidities can be determined once for all by experiments on small samples. The determination of the mineral acidity of each new batch of oil solution is then the only control operation required for determining the volume of the clarifying solution. For large scale operation the method is still further standardized by keeping all factors preceding the clarifying treatment including the time of settling constant. In this case when the time for the clarifying treatment arrives the mineral acidity and therefore the volume of clarifying solution required will also be constant.

Between the lower and upper limits indicated in the above examples there is an optimum proportion of clarifying solution which will give most satisfactory results. As to this optimum proportion the following is a crude approximation: For each cubic centimeter normal mineral acidity in 100 cc. solution there will be required approximately one per cent by volume of clarifying solution. It is specifically pointed out, however, that this is only an approximation, since useful results can be obtained by considerable deviation from this rule as long as the volumes used are within the lower and upper limits as defined before. Up to a mineral acidity of approximately 6 cc. N. the optimum quantity of clarifying solution is liable to be quite close to the average expressed in this rule, above a mineral acidity of 6 cc. N. it is more likely that a smaller quantity of clarifying solution than the rule calls for, will give best results.

In the following Table II are set forth the limits of the volume percentage of clarifying solution for the acid treated solution of a tall oil at different mineral acidities.

Table II

| Mineral acidity per 100 cc. solution, cc. N | Volume limits of a saturated calcium sulfate or a 0.55% (.05N) aluminum sulfate clarifying solution calculated as per cent on the oil solution, per cent |
|---|---|
| 2 | 1- 4 |
| 6 | 3- 8 |
| 10 | 5-11 |
| 14 | 8-13 |

It is understood that these figures refer only to one particular commercial grade of crude tall oil. For other oils these limits are quite comparable although they might be somewhat different. With every oil there is a lower and upper limit outside of which no separation can be achieved.

The separation of the sulphated compounds by this method takes place at ordinary temperatures.

While the separation below 20° C. is slow, its speed increases with moderate rise of the temperature. Between 30 and 40° C. even in a large tank the separation is completed in a few hours.

The quantity of the sulphated layer obtained is the larger, the higher the mineral acidity of the oil solution was at the time the clarifying solution was added. For this reason we prefer to let settling proceed to a considerably lower mineral acidity than is obtaining right after the acid treatment. The separation also becomes faster and sharper at lower mineral acidities. Our preferred range of mineral acidity for clarifying by this method is from approximately 14 to approximately 2 cc. N. Our usual practice is settling over night or approximately 16–24 hours.

The separated lower layer contains approximately 80–95% of all the sulphated compounds present in the oil solution. In appearance it is usually considerably darker than the supernatant upper layer, and is much more viscous. It represents essentially a solution of the sulphated compounds in a weak salt solution and is of a strong acid reaction. Since it is a highly concentrated emulsifying agent, it keeps in colloidal solution a portion of the unsulphated oil and solvent. However, the sulphated layer is invariably clear and transparent. It does not lose its transparency if, after long standing, especially at somewhat higher than ordinary temperatures, some of the dissolved unsulphated oil solution separates out as an upper layer or, if due to hydrolysis of the more labile sulphated compounds, the clarifying solution becomes highly acid and partially settles out as an aqueous lower layer. Besides settling we have other means for the recovery of the unsulphated oil solution, such as for example complete or partial neutralization of the mineral acidity of the sulphated layer, and adjusting the concentration by adding water until a spontaneous and complete separation of the unsulphated oil solution will take place. This separation is often accelerated by adding a small portion of solvent.

The oil solution from which the major portion of the sulphated compounds has been separated still has a slight mineral acidity. This we remove by neutralization with a dilute alkali or strong salt solution which is followed by washing with water. Acid treated oil solutions which are slightly oxidized by sulphuric acid and by odor indicate the presence of sulphur dioxide, are conveniently treated with a quantity of lime water sufficient to neutralize the sulphur dioxide or mixed with a minute quantity of aqueous alkali. If necessary the oil solution now may be dehydrated by stirring with a small quantity of anhydrous sodium sulphate.

The oil solution so obtained is completely neutral to methyl orange, is of a light yellow color and entirely devoid of the emulsifying tendency of the original acid treated oil solution. It is now ready for distillation.

The following additional examples are introduced for the purpose of illustrating our invention, but are not to be construed as in limitation thereof.

Example III 200 pounds tall oil from a Louisiana Kraft mill were dissolved in 150 pounds naphtha. The solution was cooled to 16° C., treated with 6 pounds 66° Bé. sulphuric acid and after adding the acid, stirred 30 minutes longer. The mixture was now centrifuged, the precipitate worked up for phytosterol and the clear solution treated with 12 pounds 66° Bé. sulphuric acid at 18° C. After sufficient stirring 100 pounds naphtha were added to the oil solution and the solution left to settle for 4 hours. After separating the acid sludge, the clear solution was transferred to a clarifying tank and found to have an acidity of 9. Three gallons of a 5% sodium phosphate solution were stirred in and the mixture left to separate over night. The lower layer was drained off and the upper layer almost neutralized with sodium hydroxide. After treating with fuller's earth, the solution was distilled with steam to remove the naphtha. An oil of light color and pleasant odor was obtained.

Example IV

Procedure the same as in Example III, except step before treatment with fuller's earth. Instead of neutralization with sodium hydroxide, the oil solution was washed with hot water to reduce the acidity of the oil solution still further.

Example V 100 parts by weight, of crude tall oil, from the southeastern portion of the United States were treated with 6 parts 60° Bé. sulphuric acid at 30–35° C. The mixture was centrifuged, the precipitate worked up for phytosterol and the clear oil dissolved in 70 parts naphtha. The solution was treated with 6 parts 66° Bé. sulphuric acid at 27° C. and left to settle for 16 hours. The now clear solution having a mineral acidity of about 8 was mixed in a clarifying tank with 12 parts of water, which was saturated with calcium sulphate, and left until the sulphated compounds separated as a lower layer. The upper oil layer was now treated with a 20% sodium sulphate solution, washed with water and then with lime water until the odor of sulphur dioxide disappeared. The clear oil solution was then distilled in vacuo until all the naphtha was removed and a light colored oil of pleasant odor was obtained.

Example VI 100 parts by weight of a crude tall oil from the southeastern portion of the United States were dissolved in 75 parts naphtha. The solution was treated with 14 parts 52° Bé. sulphuric acid at a temperature of 20° C. and centrifuged. The clear oil solution was then treated with 6 parts 66° Bé. sulphuric acid, settled and the solution which now had a mineral acidity of 7 was clarified with 8 parts of a 0.5% aluminum sulphate solution and residual acidity neutralized with a strong sodium sulphate solution, washed with lime water to remove sulphur dioxide and distilled to removed the solvent.

We claim as our invention:

1. The process of clarifying a sulfuric acid refined tall oil solution by removing sulfated compounds therefrom which comprises mixing therewith a dilute aqueous solution of a salt selected from the group consisting of neutral and alkaline mineral salts of from about 0.1 to about 5.0% concentration in a volume of from at least 50% to about 200% of the mineral acid concentration of the tall oil solution to cause concentration of the sulfated compounds in a readily separable lowermost layer.

2. The process of separating sulfated compounds from a solvent solution of sulfuric acid refined tall oil which comprises admixing therewith a dilute aqueous solution of a salt selected from the group consisting of neutral and alkaline mineral salts of from about 0.1 to about 5.0% concentration in a volume of from at least 50% to about 200% of the mineral acid concentration of the tall oil solution and proportionately regulated to cause concentration therein and separation thereby of a major amount of said sulfated compounds.

3. The process of removing sulfated compounds from a solvent solution of sulfuric acid refined tall oil which comprises mixing therewith a dilute aqueous solution of a salt selected from the group consisting of neutral and alkaline mineral salts of from about 0.1 to about 5.0% concentration in a limited volume of at least 50% of the mineral acid concentration of the tall oil solution and just sufficient to permit the formation of two separate layers.

4. The process of clarifying a sulfuric acid refined solvent solution of tall oil to remove sulfated compounds therefrom which comprises gradually admixing therewith a dilute aqueous solution of a salt selected from the group consisting of neutral and alkaline mineral salts of from about 0.1 to about 5.0% concentration in a limited volume of at least 50% of the mineral acid concentration of the tall oil solution and just sufficient to permit the formation of two separate layers and to cause concentration of the sulfated compounds in the lower layer without emulsification of the tall oil, and recovering the clarified tall oil from the upper layer.

5. The process of clarifying a sulfuric acid refined solvent solution of tall oil to remove sulfated compounds resulting from the reaction of sulfuric acid with the tall oil components during the refining treatment, which comprises admixing therewith a dilute aqueous solution of a salt selected from the group consisting of neutral and alkaline mineral salts of from about 0.1 to about 5.0% concentration in a limited volume of from at least 50% to about 200% sufficient to cause a rapid and clear formation of two separate layers and to concentrate the sulfated compounds in the lower layer, the proportion of said salt solution being in direct relationship to the mineral acid content of said tall oil solution at the time of clarifying.

6. The process of clarifying a sulfuric acid refined tall oil solution by removing sulfated compounds therefrom which comprises mixing therewith a dilute aqueous solution of a salt selected from the group consisting of neutral and alkaline mineral salts of from about 0.1 to about 5.0% concentration to cause concentration of the sulfated compounds in a readily separable lowermost layer, the volume of said salt solution being approximately equal to the volume of normal mineral acid content of said tall oil solution at the time of clarifying.

7. The process of clarifying a sulfuric acid refined tall oil solution to remove sulfated compounds therefrom which comprises admixing therewith an aqueous solution of a salt selected from the group consisting of neutral and alkaline mineral salts of from about 0.1 to 0.5 normal concentration in a volume of from at least 50% to about 200% of the mineral acid concentration of the tall oil solution to remove and concentrate the major portion of the sulfated compounds in a separate heavier layer.

8. The process of clarifying a sulfuric acid refined tall oil solution to remove sulfated compounds therefrom which comprises admixing therewith an aqueous solution of a salt selected from the group consisting of neutral and alkaline mineral salts of from about 0.1 to about 5.0% concentration in a volume approximately equal to the normal mineral acid concentration of the said tall oil solution and sufficient to cause a relatively rapid and clear separation into two layers, and separating a major proportion of the sulfated compounds in concentrated form in the lower layer.

9. The process of clarifying a sulfuric acid refined tall oil solution to remove sulfated compounds therefrom which comprises admixing therewith an aqueous solution of a salt selected from the group consisting of neutral and alkaline mineral salts of from about .01 to 0.5 normal concentration in a volume of from at least 50% to about 200% of the mineral acid concentration of the tall oil solution and proportionately regulated to remove and concentrate the major portion of the sulfated compound in a separate heavier layer, removing said layer, neutralizing the residual mineral acidity of the remaining tall oil solution, washing it with water and subjecting it to distillation to separate the solvent to recover the refined and clarified tall oil.

10. The process of clarifying a sulfuric acid refined tall oil solution to remove sulfated compounds therefrom which comprises admixing therewith an aqueous solution of a salt selected from the group consisting of neutral and alkaline mineral salts of from about .01 to 0.5 normal concentration in a volume of from at least 50% to about 200% of the mineral acid concentration of the tall oil solution and proportionately regulated to remove and concentrate the major portion of the sulfated compound in a separate heavier layer, removing said layer, treating the remaining tall oil solution with a dilute alkali solution to neutralize residual mineral acidity thereof, washing it with water and subjecting it to distillation to separate the solvent to recover the refined and clarified tall oil.

11. The process of clarifying a sulfuric acid refined tall oil solution to remove sulfated compounds therefrom which comprises admixing therewith an aqueous solution of a salt selected from the group consisting of neutral and alkaline mineral salts of from about .01 to 0.5 normal concentration in a volume of from at least 50% to about 200% of the mineral acid concentration of the tall oil solution and proportionately regulated to remove and concentrate the major portion of the sulfated compound in a separate heavier layer, removing said layer, treating the remaining tall oil solution with a strong salt solution to neutralize residual mineral acidity thereof, washing it with water and subjecting it to distillation to separate the solvent to recover the refined and clarified tall oil.

12. The process of clarifying a sulfuric acid refined tall oil solution to remove sulfated compounds therefrom which comprises admixing therewith an aqueous solution of a salt selected from the group consisting of neutral and alkaline mineral salts of from about .01 to 0.5 normal concentration in a volume of at least 50% to about 200% of the mineral acid concentration of the tall oil solution and proportionately regulated to remove and concentrate the major portion of the sulfated compound in a separate heavier layer, removing said layer, treating the remaining tall oil solution to neutralize a major portion of the residual mineral acidity thereof, washing it with water, treating it with lime water to remove sulfur dioxide and subjecting it to distillation to separate the solvent to recover the refined and clarified tall oil.

13. In a process of refining crude tall oil comprising treatment of said tall oil dissolved in a solvent at a temperature of from about 0° to about 35° C. with sulfuric acid in a quantity and of a strength sufficient to precipitate the coloring matter, phytosterol and unsaponifiable matter content thereof, the step which comprises clarifying the resultant tall oil solution to remove sulfated compounds therefrom by admixing it with a dilute aqueous solution of a salt selected from the group consisting of neutral and alkaline mineral salts of from about 0.1 to about 5.0% concentration in a volume of from at least 50% to about 200% of the mineral acid concentration of the tall oil solution and adequate to cause concentration of the sulfated compounds in a readily separable heavier layer.

14. A process of refining crude tall oil which comprises dissolving the oil in a solvent, treating it at a temperature of from about 0° to about 35° C. with sulfuric acid in a quantity and of a strength sufficient to precipitate the coloring matter, phytosterol and unsaponifiable matter content thereof, admixing the resultant refined tall oil solution with at least 50% by volume of a dilute aqueous clarifying solution of a salt selected from the group consisting of neutral and alkaline mineral salts of from about 0.1 to about 5.0% concentration and thereafter adding additional increments of said solution sufficient only to cause concentration and separation in a heavier layer of sulfated compounds resulting from reaction of the sulfuric acid with the tall oil components, separating the clarified tall oil solution, removing residual mineral acid content therefrom and separating the tall oil from the solvent by distillation.

15. A process of refining crude tall oil which comprises dissolving the oil in a solvent, treating it at a temperature of from about 0° to about 35° C. with sulfuric acid in a quantity and of a strength sufficient to precipitate the coloring matter, phytosterol and unsaponifiable matter content thereof, admixing the resultant refined tall oil solution with a dilute aqueous clarifying solution of a salt selected from the group consisting of neutral and alkaline mineral salts of from about 0.1 to about 5.0% concentration to cause concentration and separation in a heavier layer of sulfated compounds resulting from reaction of the sulfuric acid with the tall oil components, the said salt solution being in a volume bearing a direct proportional relationship and approximately equal to the volume of normal mineral acid content of the refined tall oil solution, separating the clarified tall oil solution, removing residual mineral acid content therefrom and separating the tall oil from the solvent by distillation.

16. The process of separating sulfated compounds from a solvent solution of sulfuric acid refined tall oil which comprises admixing therewith a dilute aqueous solution of calcium sulfate of from about 0.1 to about 0.2% concentration in a volume of from at least 50% to about 200% of the mineral acid concentration of the tall oil solution and proportionately regulated to cause concentration therein and separation thereby of a major amount of said sulfated compounds.

17. The process of separating sulfated compounds from a solvent solution of sulfuric acid refined tall oil which comprises admixing therewith a dilute aqueous solution of aluminum sulfate of from about 0.1 to about 5.0% concentration in a volume of from at least 50% to about 200% of the mineral acid concentration of the tall oil solution and proportionately regulated to cause concentration therein and separation thereby of a major amount of said sulfated compounds.

18. The process of separating sulfated compounds from a solvent solution of sulfuric acid refined tall oil which comprises admixing therewith a dilute aqueous solution of sodium phosphate of from about 0.1 to about 5.0% concentration in a volume of from at least 50% to about 200% of the mineral acid concentration of the tall oil solution and proportionately regulated to cause concentration therein and separation thereby of a major amount of said sulfated compounds.

19. The process of refining a sulfuric acid refined tall oil solution to remove sulfated compounds therefrom which comprises admixing therewith an aqueous solution of a salt selected from the group consisting of neutral and alkaline mineral salts of from about .01 to about 0.5% normal concentration in a volume of from at least 50% to about 200% of the mineral acid concentration of the tall oil solution and proportionately regulated to remove and concentrate the major portion of the sulfated compounds in a separate heavier layer, removing said layer, treating the remaining tall oil solution with a strong sodium sulfate solution to neutralize residual mineral acidity thereof, washing it with water and subjecting it to distillation to separate the solvent to recover the refined and clarified tall oil.

FREDERICK H. GAYER.
CHARLES E. FAWKES.